(12) United States Patent
Pulhug

(10) Patent No.: US 8,934,476 B2
(45) Date of Patent: Jan. 13, 2015

(54) ENABLING AD-HOC DATA COMMUNICATION OVER ESTABLISHED MOBILE VOICE COMMUNICATIONS

(75) Inventor: Harold James Pulhug, Poulsbo, WA (US)

(73) Assignee: Cisco Technology, Inc., San Jose, CA (US)

(*) Notice: Subject to any disclaimer, the term of this patent is extended or adjusted under 35 U.S.C. 154(b) by 2055 days.

(21) Appl. No.: 11/944,944

(22) Filed: Nov. 26, 2007

(65) Prior Publication Data

US 2009/0135806 A1    May 28, 2009

(51) Int. Cl.

| H04L 12/66 | (2006.01) |
| H04L 29/06 | (2006.01) |
| H04M 3/42 | (2006.01) |
| H04W 4/00 | (2009.01) |
| H04J 3/16 | (2006.01) |
| G06F 15/173 | (2006.01) |

(52) U.S. Cl.
CPC ....... *H04L 65/1069* (2013.01); *H04M 3/42382* (2013.01); *H04L 65/4023* (2013.01); *H04L 63/10* (2013.01); *H04M 2203/654* (2013.01); *H04M 2250/02* (2013.01); *H04M 2250/64* (2013.01)
USPC ............ 370/352; 370/338; 370/466; 709/223

(58) Field of Classification Search
USPC ............ 370/352, 338, 466; 709/223; 713/164
See application file for complete search history.

(56) References Cited

U.S. PATENT DOCUMENTS

| 7,003,298 | B1 | 2/2006 | Jagadeesan |
| 7,209,978 | B2 | 4/2007 | Thubert et al. |
| 7,221,750 | B2 | 5/2007 | Brahmbhatt et al. |
| 2006/0140151 | A1 | 6/2006 | Dantu et al. |
| 2006/0232677 | A1 | 10/2006 | Butadney et al. |
| 2006/0245399 | A1 | 11/2006 | Holur et al. |
| 2008/0031231 | A1* | 2/2008 | Matias et al. ............... 370/352 |
| 2009/0132816 | A1* | 5/2009 | Lee .............................. 713/164 |
| 2010/0229229 | A1* | 9/2010 | Kumar et al. .................... 726/7 |

* cited by examiner

*Primary Examiner* — Asad Nawaz
*Assistant Examiner* — Stephanie Chang

(57) ABSTRACT

In one embodiment, a first PC may receive a trigger to establish a data communication session with a second PC over an established voice call between first and second phones over a WAN. In response, the first PC may discover the first phone as an authorized personal area network (PAN) device, and may establish a first PAN communication session between the first PC and the first phone. A request may then be transmitted to the second phone over the established voice call to establish the data communication session between the first and second PCs, and in response, the second phone may discover the second PC as an authorized PAN device from the second phone. A second PAN communication session may thus be established between the second phone and the second PC, and data may be exchanged between the PCs using the PAN communication sessions and the established voice call.

22 Claims, 5 Drawing Sheets

US 8,934,476 B2

ENABLING AD-HOC DATA COMMUNICATION OVER ESTABLISHED MOBILE VOICE COMMUNICATIONS

TECHNICAL FIELD

The present disclosure relates generally to computer networks and, more specifically, to communicating data between computers over the networks.

BACKGROUND

Personal computers (PCs) often share/exchange data over wired and/or wireless communication networks, as will be understood by those skilled in the art. As such, the PCs are generally required to be connected to the communication networks in some manner, such as through Ethernet ports (e.g., at home or at an office) or wireless network adapters/cards (e.g., for wireless home networking or wireless fidelity, "Wi-Fi" networks), etc. Occasionally, however, there are times when a PC is unable to connect to a communication network, such as where no acceptable wired or wireless connection is conventionally available. Also, even in certain situations where an acceptable connection to a communication network is available, the process involved with establishing the connection may be time-consuming and complex.

For example, two users separated by a large distance may communicate with one another over an established voice call (e.g., using cellular/mobile phones), and may each have a PC (e.g., a laptop) locally accessible. If a first user wishes to send a second user a document to discuss while on the voice call, the first and second users must have access to the communication network. If either one of the PCs is unable to connect to a communication network (e.g., no conventional wired or wireless access, etc.), then the users are generally unable to exchange the document/data. As noted, even if a connection were available, to establish the connection to the communication network (i.e., to "get online") at this point of the call may be a long and arduous process. For example, each user may need to acquire a wireless connection (e.g., obtain an encryption key/authorization, etc.), then access a virtual private network (VPN), then log onto a conference server, and finally share the document through the conference server. The result of this process is a disruption in the flow of communications between the two users, thus being particularly inefficient and ineffective (and possibly frustrating).

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a first personal computer (PC) may receive a trigger to establish a data communication session with a second PC over an established voice call between first and second communication devices (e.g., mobile/cellular phones), over a wide area network (WAN). In response, the first PC may discover the first phone as an authorized personal area network (PAN) device, and may establish a first PAN communication session between the first PC and the first phone (e.g., a Bluetooth® session). A request may then be transmitted to the second phone over the established voice call to establish the data communication session between the first and second PCs, and in response, the second phone may discover the second PC as an authorized PAN device from the second phone. A second PAN communication session may thus be established between the second phone and the second PCs, and data may be exchanged between the first and second PC using the first and second PAN communication sessions and the established voice call. Accordingly, the first and second PCs use local (PAN) communication sessions to leverage the existing voice call to communicate data, such as where there is no other network connection between the first and second PCs.

Description

A computer network is a geographically distributed collection of nodes interconnected by communication links and segments for transporting data between end nodes, such as personal computers (PCs) and workstations (e.g., desktops and laptops). Many types of networks are available, such as local area networks (LANs) and wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols. In this context, a protocol consists of a set of rules defining how the nodes interact with each other.

Figure 1:
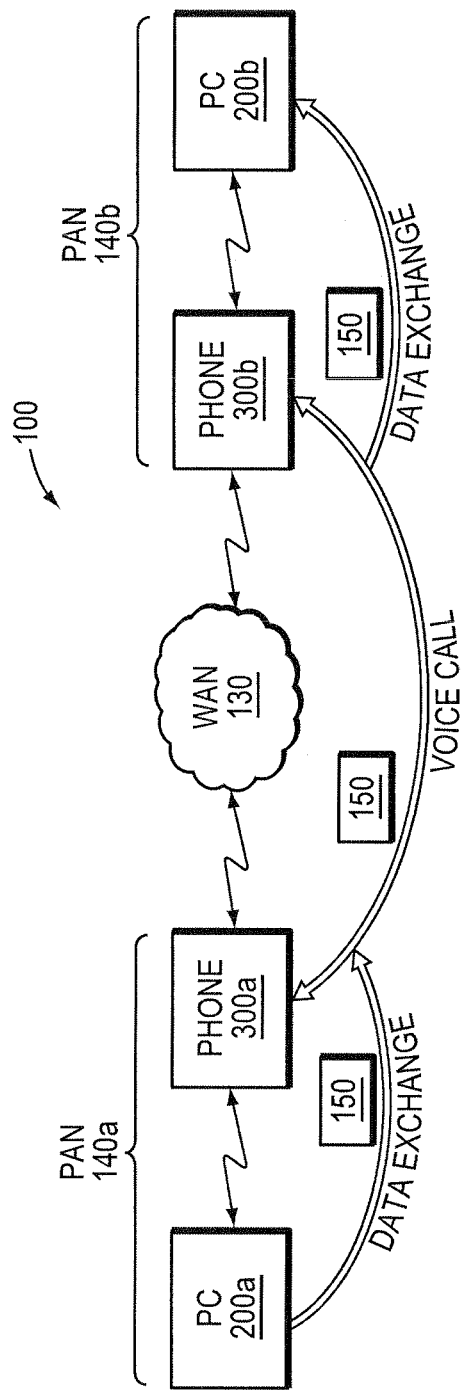
FIG. 1 illustrates an example computer network.

FIG. 1 is a schematic block diagram of an example computer network 100 illustratively comprising nodes/devices, such as one or more PCs 200 (e.g., 200*a* and 200*b*), one or more communication device, such as phones 300 (e.g., 300*a* and 300*b*), and a WAN 130. Illustratively, the nodes/devices may be interconnected by links (e.g., physical and/or wireless) in a manner as described herein in accordance with one or more embodiments of the disclosure. Those skilled in the art will understand that any number of nodes, devices, links, etc. may be used in the computer network, and that the view shown herein is for simplicity. Also, data packets 150 (e.g., traffic) may be exchanged among the nodes/devices of the computer network 100 using a variety of techniques as described herein.

Figure 2:
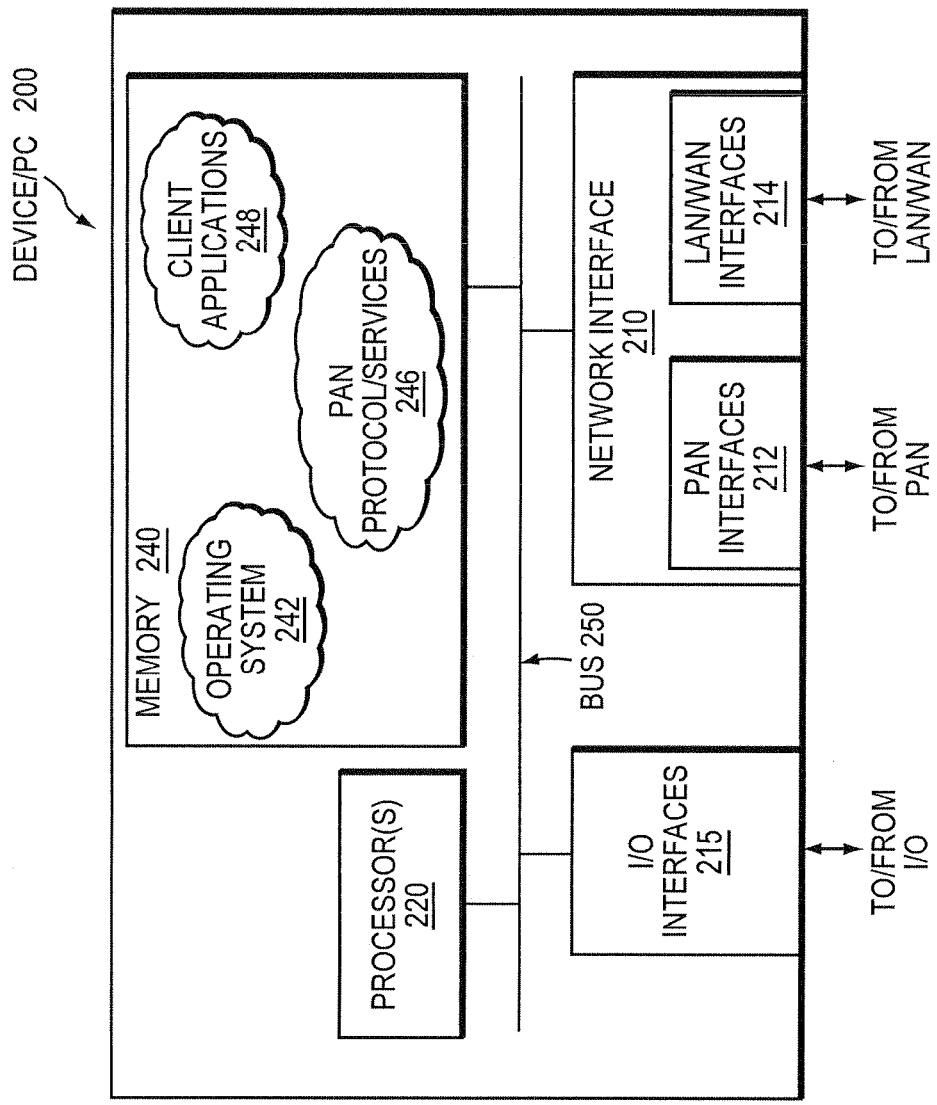
FIG. 2 illustrates an example device/PC.

FIG. 2 is a schematic block diagram of an example node/device 200 that may be advantageously used with one or more embodiments described herein, e.g., as a first PC 200*a* and/or a second PC 200*b*. The device comprises a plurality of network interfaces 210, one or more Input/Output (I/O) interfaces 215, one or more processors 220, and a memory 240 interconnected by a system bus 250. The I/O interfaces 215 contain the mechanical, electrical, and signaling circuitry for communicating with input and output devices, such as keyboards, mice, monitors, speakers, etc. The network interfaces 210 (which may be considered to be I/O interfaces) contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. In particular, as described herein, network interfaces 210 for PCs 200 may be configured not only to communicate with devices over a LAN or WAN (interfaces 214), but also to communicate with local communication devices (e.g., phones 300) over a Personal Area Network (PAN) 140 (interfaces 212), such as through various wired or wireless communication protocols, e.g., Bluetooth®, etc.

The memory 240 comprises a plurality of storage locations that are addressable by the processor(s) 220 and the network interfaces 210 for storing software programs and data structures associated with the embodiments described herein. The processor(s) 220 may comprise necessary elements or logic adapted to execute the software programs and manipulate the data structures. An operating system 242 (e.g., the Windows™ operating system from Microsoft®, Inc.), portions of which are typically resident in memory 240 and executed by the processor(s), functionally organizes the node (PC) by, inter alia, invoking operations in support of software processes and/or services executing on the device. These software processes and/or services may comprise various client applications 248 and PAN protocol/services 246. It will be apparent to those skilled in the art that other processor and memory means, including various computer-readable media, may be used to store and execute program instructions pertaining to the inventive technique described herein.

Client applications 248 contain computer executable instructions executed by each processor 220 to perform various functions related to use of the PCs 200. For instance, various word processors, presentation programs, graphical programs, etc., may be used by clients (users) of the PCs, as will be understood by those skilled in the art. For example, in conjunction with I/O interfaces 215, various graphical user interfaces (GUIs) or command line interfaces (CLIs) may be implemented to allow a user to interact with the client applications 248 of the PCs 200, accordingly.

PAN protocol/services 246 contain various protocols and computer executable instructions executed by each processor 220 to perform functions related to PAN communication. For example, a well-known wireless PAN protocol is Bluetooth®, which allows for equipped devices to communicate with one another using Bluetooth® protocol messages to encapsulate the data/traffic (e.g., data 150 over PAN 140a). Notably, other PAN protocols may be understood by those skilled in the art, and the use of Bluetooth® herein is merely a representative example. For instance, in addition to Bluetooth sessions, other wireless local area network (WLAN) sessions and wireless fidelity (Wi-Fi) sessions may be used. Also, various wired PAN protocols may be established, such as local physical connections (serial links, RS-232 links, universal serial bus or "USB" links, etc.) as will also be understood by those skilled in the art.

Figure 3:
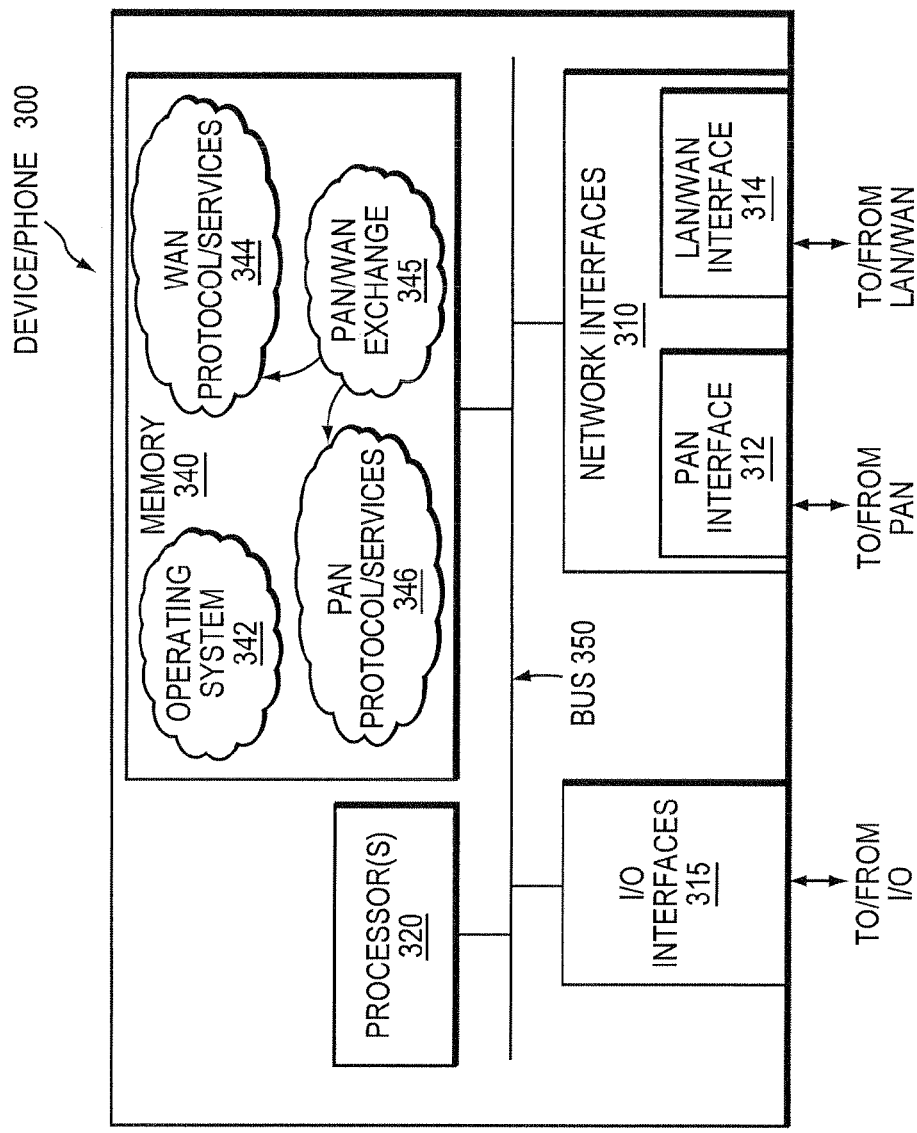
FIG. 3 illustrates an example device/phone.

FIG. 3 is a schematic block diagram of an example node/device 300 that may be advantageously used with one or more embodiments described herein, e.g., as a first phone 300a and/or a second phone 300b. The device comprises a plurality of network interfaces 310, one or more I/O interfaces 315, one or more processors 320, and a memory 340 interconnected by a system bus 350. The I/O interfaces 315 contain the mechanical, electrical, and signaling circuitry for communicating with input and output devices, such as keypads, voice command microphones, displays, speakers, etc. The network interfaces 310 contain the mechanical, electrical, and signaling circuitry for communicating data over wireless (or physical) links coupled to the network 100. The network interfaces may be configured to transmit and/or receive data using a variety of different communication protocols, including various wireless protocols (e.g., cellular, satellite, etc.) or wired protocols (e.g., common land-line telephone communication), etc. In particular, as described herein, network interfaces 310 for phones 300 may be configured not only to communicate with other phones/devices over WAN 130 (interfaces 314), but also to communicate with local devices (e.g., PCs 200) over a PAN 140 (interfaces 312), again, such as through various wired or wireless communication protocols, e.g., Bluetooth®, etc.

The memory 340 comprises a plurality of storage locations that are addressable by the processor(s) 320 and the network interfaces 310 for storing software programs and data structures associated with the embodiments described herein. The processor(s) 320 may comprise necessary elements or logic adapted to execute the software programs and manipulate the data structures. An operating system 342 (e.g., cellular/mobile phone operating systems), portions of which are typically resident in memory 340 and executed by the processor(s), functionally organizes the device (phone) by, inter alia, invoking operations in support of software processes and/or services executing on the device. These software processes and/or services may comprise PAN protocol/services 346, WAN protocol/services 344, and in accordance with embodiments described herein, PAN/WAN exchange process/services 345. It will be apparent to those skilled in the art that other processor and memory means, including various computer-readable media, may be used to store and execute program instructions pertaining to the inventive technique described herein.

WAN protocol/services 344 of phones 300 contain various protocols and computer executable instructions executed by each processor 320 to perform functions related to WAN communication, such as various mobile/cellular/satellite and/or land-based telephone communication techniques, as will be understood by those skilled in the art. For example, phones 300 may be embodied as communication devices such as mobile/cellular phones, smart phones/PDAs (personal digital assistants), internet phones (e.g., Voice over Internet Protocol, or "VoIP" phones), desktop phones, etc. Other types of phones/communication techniques may also be used in accordance with the embodiments described herein, such as RF (Radio Frequency) phones, etc., as may be appreciated by those skilled in the art. In particular, any telephonic communication between two phones may establish a WAN 130, and conventional definitions of WANs (e.g., service providers, links, routers, bridges, using the Transmission Control Protocol/Internet Protocol or "TCP/IP", User Datagram Protocol or "UDP", Asynchronous Transfer Mode or "ATM" protocol, Frame Relay protocol, Internet Packet Exchange or "IPX" protocol, etc.) are only representative examples of inter-phone communication.

Also, similar to that of the PCs 200 above, PAN protocol/services 346 for phones 300 contain various protocols and computer executable instructions executed by each processor 320 to perform functions related to PAN communication (e.g., Bluetooth®, etc.). Accordingly, PAN services 346 of the phones 300 may communicate with PAN services 246 of the respective (local) PCs 200, such as over PAN interfaces 312/212.

As noted, there are times when a PC 200 is unable to connect to a communication network (e.g., a LAN/WAN), such as where no acceptable wired or wireless connection is conventionally available (e.g., weak wireless networks or non-existent or unauthorized wired/wireless networks, etc.). Also, even in certain situations where an acceptable connection to a communication network is available, the process involved with establishing the connection may be time-consuming and complex (that is, where the PC is not already connected). Often, such situations may occur during an active/established voice call (e.g., using cellular/mobile phones 300) between two users separated by a large distance, each having a PC (e.g., a laptop) locally accessible. If at least one of the respective PCs is without (easy) access to a communication network, then the two users generally have been unable to (easily) share/exchange documents/data.

Enabling Ad-Hoc Data Communication Over Established Mobile Voice Communications

According to embodiments of the disclosure, a first PC 200a may receive a trigger to establish a data communication session with a second PC 200b over an established voice call between a first and second phones (300a and 300b, respectively) over a WAN 130. In response, the first PC 200a may discover the first phone 300a as an authorized PAN device, and may establish a first PAN communication session between the first PC and the first phone over PAN 140a. A request may then be transmitted to the second phone 300b over the established voice call (over WAN 130) to establish the data communication session between the first and second PCs 200, and in response, the second phone may discover the second PC 200b as an authorized PAN device from the second phone. A second PAN communication session may thus be established between the second phone 300b and the second PC 200b (e.g., over PAN 140b), and data may be exchanged between the first and second PCs using the first and second PAN communication sessions and the established voice call. Accordingly, the first and second PCs use local (PAN) communication sessions to leverage the existing voice call to communicate data (e.g., on a separate channel than that which carries the voice call), such as where there is no other network connection between the first and second PCs.

Operationally, two users may establish a voice call between a first phone 300a (e.g., a first user) and a second phone 300b (e.g., a second user) over a WAN 130. Any type of conventional phone/voice conversation may be established in accordance with one or more embodiments described herein, such that the voice call is also capable of carrying/transmitting data over the WAN 130 communication media (e.g., using WAN protocol services 344). For instance, second generation (2G) cellular phone technologies such as GSM (a Global System for Mobile Communications) and CDMA (Code Division Multiplex Access) may be configured to transport data in addition to voice. Third generation (3G) or fourth generation (4G) cellular technologies, on the other hand, may be more adaptable for use with the embodiments described herein, as may be appreciated by those skilled in the art, particularly due to their higher transfer rates, etc. Also, in addition to cellular technologies, other conventional voice call mediums may be used, such as satellite, RF, land-based, VoIP, etc. Notably, the phones 300a and 300b need not be of the same type (e.g., one cellular and one satellite, or one cellular and one land-based, etc., as described herein). Accordingly, WAN 130 may represent a single communication network (e.g., cellular), or a combination of communication networks, such as providing connectivity between a first cellular phone to a second land-based phone, etc. Further, connectivity between multiple service providers (SPs) of the two phones may also be represented by the WAN 130, as will be appreciated by those skilled in the art.

Illustratively, during the established voice call, the first user may wish to share data/information with the second user on respective first and second PCs 200 local to each of the users. As mentioned above, there may be situations where at least one of the PCs 200 is not currently connected to a communication network (e.g., conventional wired/wireless LAN/WAN networks), or where it is inconvenient/inefficient to use a conventional communication network. In accordance with one or more embodiments described herein, the first user may "trigger" the first PC 200a to establish a data communication session with the second PC 200b, such as through a GUI, CLI, etc. in cooperating conjunction/relation with a client application 248. For example, the client application 248 may be a dedicated program/process for establishing the data communication session with the second PC, or may be a feature of another program/process, such as a tool for use within a presentation program or word processing program, etc.

In response, to receiving the trigger, the first PC discovers the first phone 300a as an authorized PAN device. In other words, the first PC 200a may utilize PAN protocol/services 246 to search for local devices on PAN network 140a (using interface 212), and may locate the first phone 300a through the PAN protocol/services 346 of the phone (e.g., a Bluetooth® connection, as will be understood by those skilled in the art). Note that the first user may be required to authorize/accept the first phone and/or first PC as an authorized PAN device from the first PC and/or phone, respectively, such as through an authorization prompt (e.g., on a CLI/GUI). Also, since there may be other PAN-enabled phones within proximity to the first PC 200a, the first PC may be configured to select a pre-authorized phone 300a (that is, the first user's phone), or may provide a list of available phones for selection by the user. Once the first PC 200a and first phone 300a have agreed to communicate (e.g., have authorized each other), the first PC and phone may establish a first PAN communication session 140a, accordingly. Alternatively, the first PAN communication session may be established by the first PC simply sending a message 150 to the first phone using PAN communication protocols, i.e., no initial authorization. (Note that in the event a PAN communication session 140a previously exists between the first PC 200a and first phone 300a, the trigger may cause the first PC to discover/utilize that previously established session 140a, accordingly.)

Once the first PAN communication session 140a is established, the first phone 300a (or, alternatively, the first PC 200a through the first phone) may transmit a request to the second phone 300b over the established voice call (over WAN 130) to establish a data communication session between the first and second PCs. In other words, in one embodiment, the first phone 300a utilizes its PAN/WAN exchange services 345 to dynamically determine that the request is to be sent to the second phone 300b (i.e., that with which a current voice call is in progress) in response to establishing the first PAN communication session. Also, in another embodiment, the first PC (e.g., utilizing client application 248 and/or PAN protocol/services 246) may generate the request for the second phone, and may forward the request to the first phone 300a to be passed over WAN 130 to the second phone 300b. (Note also that where the first PAN session is simply sending and receiving a message 150, the transmitted request may be the message 150 forwarded over WAN 130 to the second phone 300b.)

In response to receiving the request, the second phone 300b may attempt to discover the second PC 200b as an authorized PAN device. For example, in a similar manner as described above, the second phone 300b may utilize PAN protocol/services 346 to search for local devices on a PAN network 140b (using interface 312), and may locate the second PC 200b through the PAN protocol/services 246 of the PC (e.g., a second Bluetooth® connection. In this instance, as above, the second user may be required to authorize/accept the second PC and/or second phone as an authorized PAN device from the second phone and/or PC, respectively, such as through an authorization prompt (e.g., on a CLI/GUI for the second user). Also, since there may be other PAN-enabled PCs within proximity to the second phone 300b, the second phone may be configured to select a pre-authorized PC 200b (that is, the second user's PC), or may provide a list of available PCs for selection by the user. Once the second phone 300b and second PC 200b have agreed to communicate (e.g., have authorized each other), the second phone and PC may establish a second PAN communication session 140b, accordingly. Alternatively, again, the second PAN communication session may be established by the second phone simply forwarding the received message 150 to the second PC using PAN communication protocols, i.e., with no initial authorization. (Note, again, that in the event a PAN communication session 140b previously exists between the second phone 300b and second PC 200b, the received request may cause the second phone to discover/utilize that previously established session 140b, accordingly.)

With the first and second PAN communication sessions established (140a and 140b), as well as the established voice call (over WAN 130), the first and second PCs 200 may exchange data, accordingly. In other words, the first PC 200a may send data 150 over the first PAN communication session 140a to the first phone 300a. The first phone may then send the data through the established voice call (WAN 130) to the second phone 300b, which transmits the data 150 over the second PAN communication session 140b to the second PC 200b. Illustratively, the established voice call may utilize a first communication path (channel) through the WAN 130 (e.g., a set path of network nodes/links). In one embodiment, the exchanged data 150 between the first and second PCs may also utilize that same first communication path (channel) through the WAN. However, in an alternate embodiment, a second communication path (channel) through the WAN 130 between the first and second phones may be used for the exchanged data 150 between the first and second PCs that is different from the first communication path. That is, the voice call and the data 150 may traverse different paths through the WAN, but both originate and terminate on the first and second phones 300a and 300b (such as for voice-sensitive packets versus standard data packets, as will be appreciated by those skilled in the art). Notably, the exchange of data should be substantially inaudible during the established voice call.

Accordingly, the one or more embodiments of the present disclosure permit users to facilitate a collaboration/communication session from their PCs when in an active voice call on their mobile devices (e.g., phones) without a hardwired or wireless connection to a network from their PC (other than the PAN session, that is). In particular, the initiator's PC 200a (client application 248) invokes a data communication stream that leverages the voice call from the initiator's phone 300a to be the conduit of communications to the receiver. The receiver's phone 300b receives the communications and dynamically forwards the received messages/data 150 to the receiver's PC 200b to "pop" the desired shared application/document (e.g., open/display the data on the receiver's PC), thus terminating the communication on the remote PC 200b. In this manner, the ad-hoc data communication network is based on the voice call's connectivity between the first and second phones 300. As such, the communication session between the PCs is established and maintained without (necessary) knowledge by each PC as to the destination or address of the respective remote PC. In other words, the first PC 200a shares a localized PAN session with the first phone 300a, and the voice call carries the exchanged data between the first phone and second phone 300b wherever the second phone may be (i.e., a concern of the established voice call and associated SPs). The second phone 300b shares the data with the local second PC over its PAN session, not (necessarily) according to an address of the second PC as provided by the first PC, but rather based on the fact that the second PC is located in the same PAN session (PAN 140b).

As an example of an ad-hoc communications session over an established voice call, assume that the first user on the first phone 300a communicates with a second user and a respective second phone 300b. If the first user wishes to send a document (e.g., illustratively as message 150) from the first PC 200a to the second user's second PC 200b, the first user may initiate a trigger at the first PC to send the document 150 to the second user using the ad-hoc communications session described herein (e.g., a "click-to-share" trigger). The data to be exchanged may be encoded by the first PC as images, videos, executable programs, files, raw data, etc. For instance, in this example, the document 150 is a file that the first PC is to send to the second PC, however, the first PC may further encode the document (data) 150 for the data exchange in a format suitable for transmission over the communication session, such as a video of the document as shown on the first PC (e.g., a portion of the first PC's display to be shared between the first and second PCs). Notably, a video stream may be used so that the second PC 200b need not have an application necessary to view the data (e.g., the document) itself, but only an application (248) to view the exchanged video. For example, the video may be encoded in an H.264/SVC (Scalable Video Coding) or MPEG-4 format (as will be understood by those skilled in the art), and may be transmitted to the first phone 300a using a communication protocol over the first PAN session (140a).

An illustrative protocol that may be used to "stream" the video from the first PC 200a to the first phone 300a is the known SMIL (synchronized multimedia integration language) protocol. The SMIL protocol is an open source communication protocol for PAN networks (e.g., PC-to-phone) that is designed for rich media (images, audio, video, rich text, etc.) and is compatible with MMS (Multimedia Message Service, not just text as in the Short Message Service or "SMS"). For example, the first and second phones 300 may communicate the data 150 over the established voice call using MMS messages, as will be appreciated by those skilled in the art. That is, the PAN/WAN exchange 345 on the first phone 300a may take SMIL requests/messages 150, and sends them to the second phone 300b using MMS messages. Since the voice call is already in progress, the phones can gain the destination information for the MMS messages, accordingly. The second phone 300b receives the MMS messages (150), and PAN/WAN exchange 345 extracts the SMIL stream and forwards it over PAN 140b to the second PC 200b. The corresponding application on the second PC 200b (e.g., PAN services 246 and/or a specific client application 248) may then decode the SMIL stream and display the sender's content on the second PC. In this manner, the established voice call remains (is not "dropped"), and data may be transmitted between the first and second PCs. Particularly, data and voice may be transmitted simultaneously, with data inaudibly layered onto the existing voice communications stream.

Notably, while the embodiments mentioned above describe both PCs as not being interconnected with a communication network (that is, via a connection other than through a respective PAN communication session 140 with either the first or second phone), one or more other embodiments may also utilize the techniques described herein. For instance, at least one of the first and second phones 300 may be embodied as a smartphone having both the respective PC (e.g., 200b) and phone (e.g., 300b) on a single device. In this scenario, the respective PAN communication session (e.g., 140b) may be localized to the single device, i.e., both receiving voice-encapsulated data 150 (e.g., MMS data), and converting it to a displayable format (e.g., either through the SMIL protocol or direct to a display application 248 on the smartphone). Also, one or the other of either the phone-to-WAN connections or the PAN sessions 140 may be hardwired as opposed to wireless/mobile. For instance, if the second phone 300b is hardwired to an access point of the WAN 130 (e.g., a desk/house phone), it may still have PAN services 346 and the associated capability to communicate with an aptly equipped second PC 200b. Also, one of the first or second PAN communication sessions may be a hardwired session, such as where a phone 300 and respective PC 200 are hardwired to each other (e.g., using various hardwire communication media and protocols), yet the phone still utilizes the established voice call to transmit the data 150. (Note that either of the respective first and second pairs of phones/PCs may be wired and/or wireless, accordingly.)

Figure 4:
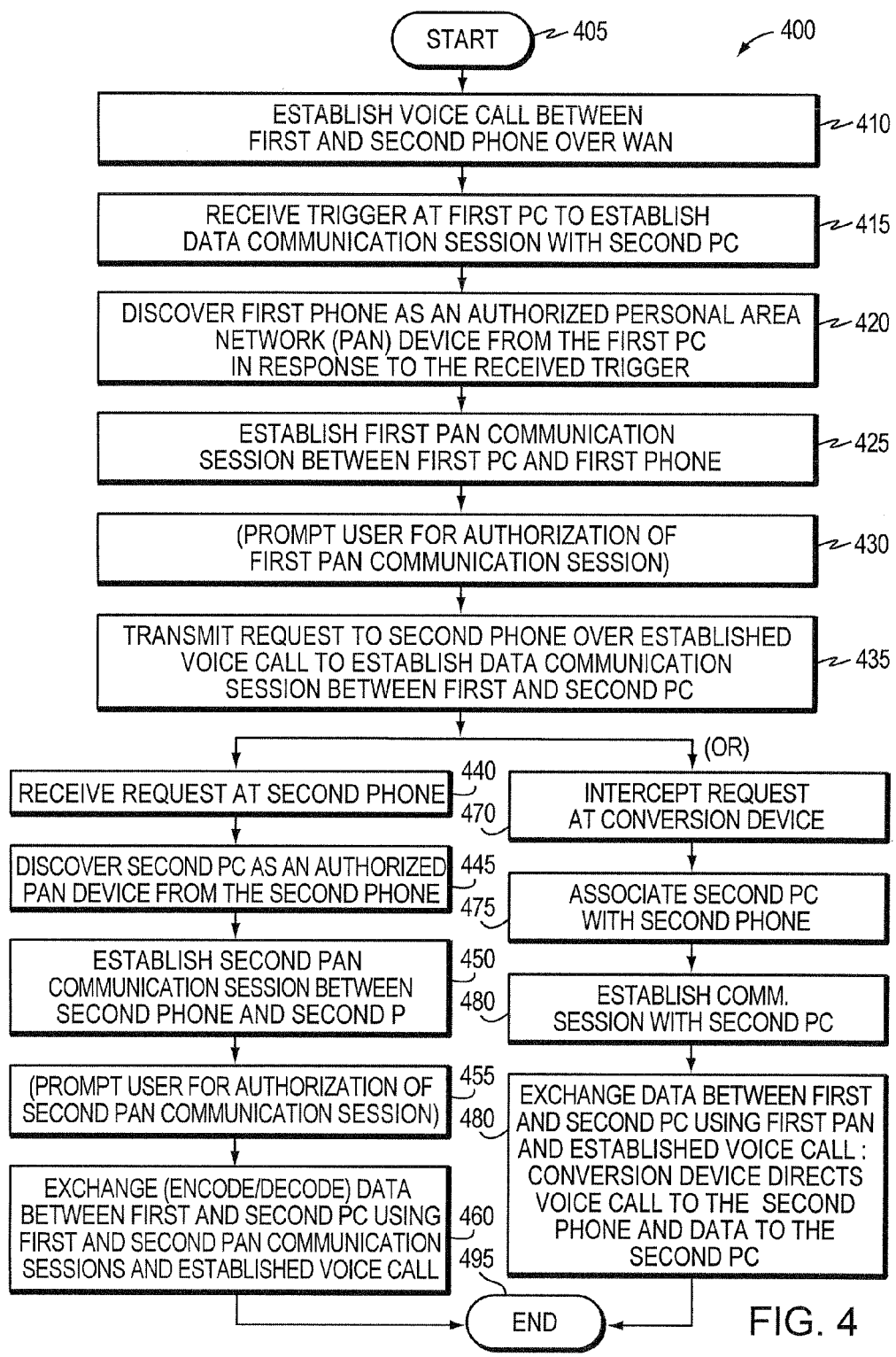
FIG. 4 illustrates an example procedure for enabling ad-hoc data communication over established mobile voice communications.

FIG. 4 illustrates an example procedure for enabling ad-hoc data communication over established mobile voice communications in accordance with one or more embodiments described herein. The procedure 400 starts at step 405, and continues to step 410, where a voice call is established between a first phone (e.g., 300a) and second phone (e.g., 300b) over a WAN (e.g., 130). For instance, an illustrative embodiment described above utilizes two mobile (e.g., cellular) phones 300 over a cellular WAN 130. At step 415, a trigger may be received at a first PC (e.g., 200a, such as a first user's laptop) to establish a data communication session with a second PC (e.g., 200b, such as a second user's laptop). The first PC 200a then discovers the first phone 300a as an authorized PAN device in step 420 over PAN 140a, for example, through a discovery communication protocol, such as Bluetooth®. A first PAN communication session may be established in step 425 in response to the discovered device between the first PC and the first phone. Illustratively, an authorization request may be prompted from a user in step 430 for the PAN communication session, e.g., for security.

In step 435, a request is transmitted to the second phone 300b over the established voice call (e.g., by the first phone 300a or the first PC 200a via the first phone, as mentioned above) to establish the data communication session between the first and second PC (e.g., over WAN 130). The second phone receives the request in step 440, and may dynamically discover the second PC 200b as an authorized PAN device in step 445 over PAN 140b. Upon discovery, the second phone and second PC may establish a shared second PAN communication session in step 450 (again, optionally prompting a second user for authorization in step 455). Once the second PAN communication session is established, the first and second PCs may exchange data (e.g., respectively encoding and decoding data/messages 150) in step 460 using the first and second PAN communication sessions and the established voice call (e.g., over WAN 130). For example, in a manner described above, the first PC 200a may encode a video stream to be transmitted over the ad-hoc communication sessions (first and second PANs along with the established voice call), and the second PC 200b may receive the encoded video stream, and may decode the content accordingly. The procedure 400 ends in step 495.

Figure 5:
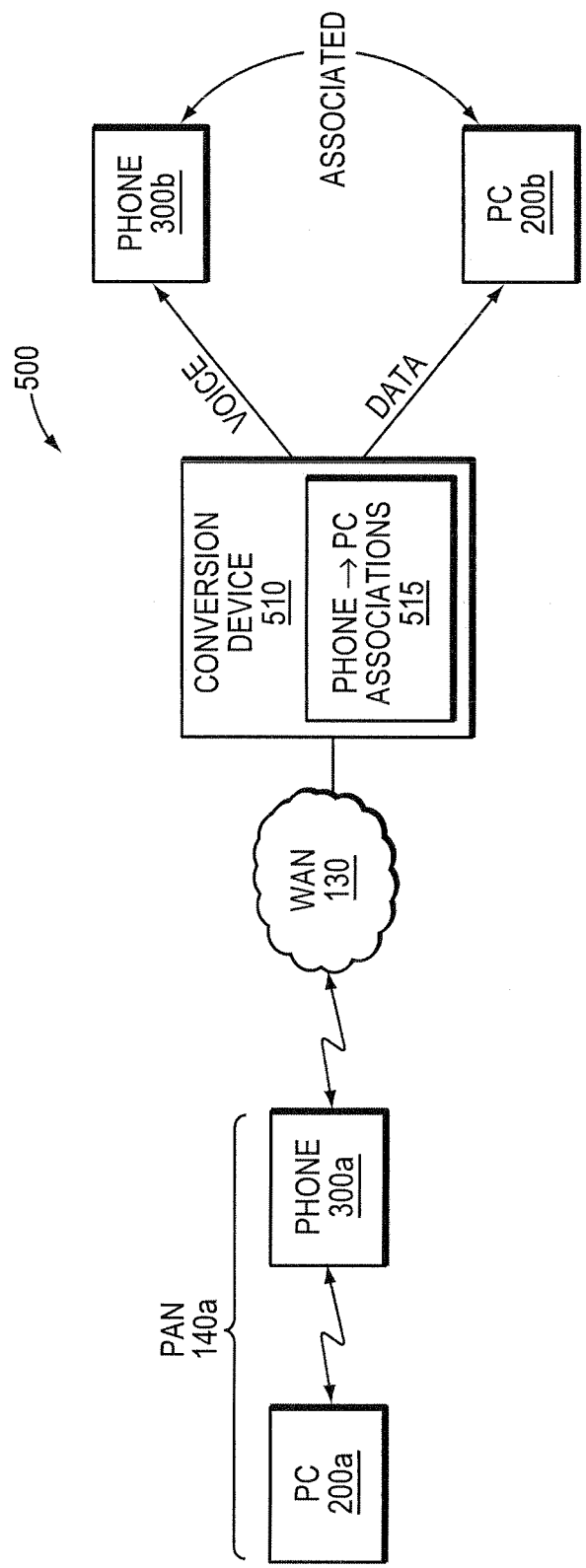
FIG. 5 illustrates an example computer network of an alternate embodiment.

Notably, while the embodiments shown and described above reference first and second PAN communication sessions 140 being utilized between the two phones 300 and two PCs, the disclosure is not limited to dual PAN communication sessions. For example, a single PAN communication session (e.g., 140a) may be utilized in accordance with one or more alternative embodiments. FIG. 5 illustrates an example network 500 that is similar to network 100 of FIG. 1 above, however instead of two PAN communication sessions 140, the second phone/PC communication sessions (WAN connectivity as well as PAN communication session 140b) is configured in a different manner. In particular, interconnected with the WAN 130 is a conversion device 510, which may be used to direct or "route" traffic from the WAN to appropriate devices, such as both phones 300 and PCs 200. For instance, the first phone 300a may transmit a request to wired phone 300b of network 500 over the established voice call to establish the data communication session between the first and second PCs. In this situation, however, the conversion device 510 (e.g., within the WAN 130) intercepts the request, and determines the second PC 200b that is associated with the wired phone. For example, based on a configured listing of phone-to-PC associations 515 (e.g., manually and/or dynamically configured), the conversion device may be aware of an association between particular phones 300 of the network 500 and particular PCs 200, such as a particular office phone to a PC in that office. Accordingly, upon receiving the request, the conversion device may establish a wired communication session with the appropriate second PC 200b based on the associated phone 300b of the established voice call. In this manner, data 150 may be exchanged between the first and second PCs using the first wireless PAN session 140a and the established voice call, where the conversion device 510 directs the voice call to the wired phone 300b and the exchanged data to the second PC 200b.

For instance, returning to FIG. 4, procedure 400 may continue from step 435 to step 470 (that is, instead of step 440), where a conversion device 510 intercepts the request to establish a data communication session between the first and second PCs (e.g., over WAN 130). In step 475, the conversion device 510 associates the second PC 200b with the second phone 300b, such as through various configured lists/tables 515, and establishes a communication session with the second PC in step 480. Once this communication session is established, the first and second PCs may exchange data in step 485 (e.g., respectively encoding and decoding data/message 150) using the first PAN communication session and established voice call. In particular, the conversion device 510 receives voice traffic and data traffic, and directs the voice call to the second phone 300b and the data to the second PC 200b, accordingly, and the procedure 400 ends in step 495.

Advantageously, the novel techniques described herein enable ad-hoc data communication over established mobile voice communications in a computer network. By allowing two remote PCs to communicate over an established voice call through dynamically established PAN communication sessions with the phones at either end of the voice call, the novel techniques allow for peer-to-peer communications between the PCs using generally standard mobile device and PC hardware/software components (e.g., Bluetooth® and cellular networks), e.g., where conventional connections to communication networks are unavailable or otherwise inconvenient to access. In particular, the techniques described above may utilize any standards-based network as either PAN communication session and for the voice call, allowing a wide range of connectivity for appropriately configured devices. Also, the dynamic aspects of one or more embodiments described herein alleviate the need for cumbersome and inefficient manual configuration.

While there have been shown and described illustrative embodiments that enable ad-hoc data communication over established mobile voice communications in a computer network, it is to be understood that various other adaptations and modifications may be made within the spirit and scope of the present invention. For example, the embodiments have been shown and described herein using particular protocols for the voice call (and WAN), PAN communication sessions, and the exchange of data/messages. However, the embodiments of the invention in their broader sense are not so limited, and may, in fact, be used with other protocols not explicitly mentioned herein, but that may be suitable for use in accordance with the techniques as described in the present disclosure. For instance, while the data exchange between the first and second PCs is illustratively a bi-directional exchange, a one-way exchange (e.g., from the first/initiating PC to the second PC, or vice versa) may be utilized.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
    establishing a voice call between first and second phones over a wide area network (WAN);
    receiving a trigger at a first computer to establish a data communication session with a second computer, wherein at least one of the first and second computers lack access to a network for direct communication between the first and second computers over the network;
    discovering the first phone as a first authorized network device from the first computer in response to the received trigger;
    establishing a first network communication session between the first computer and the first phone to provide the first computer access to the established voice call on the WAN;
    transmitting a request to the second phone over the established voice call to establish the data communication session between the first and second computers;
    in response to receiving the request, discovering the second computer as a second authorized network device from the second phone;
    establishing a second network communication session between the second phone and the second computer to provide the second computer access to the established voice call on the WAN; and
    exchanging data over the WAN between the first and second computers using the first and second network communication sessions and the established voice call; and
    wherein the first and second phones are mobile or cellular phones.

2. The method as in claim 1, wherein the network devices are personal area network (PAN) devices and network communication sessions are PAN communication sessions.

3. The method as in claim 1, wherein at least one of the first and second network communication sessions is a wireless session.

4. The method as in claim 3, further comprising:
    selecting the wireless session from the group consisting of: wireless local area network (WLAN) sessions, and wireless fidelity (Wi-Fi) sessions.

5. The method as in claim 1, wherein at least one of the first and second phones is a wireless phone selected from the group consisting of: cellular phones, satellite phones, and radio frequency (RF) phones.

6. The method as in claim 1, wherein at least one of the first and second network communication sessions is a hardwired session.

7. The method as in claim 1, wherein at least one of the first and second phones is hardwired to an access point of the WAN.

8. The method as in claim 1, further comprising:
    utilizing a first communication path through the WAN for the established voice call.

9. The method as in claim 8, further comprising:
    utilizing the first communication path through the WAN for the exchanged data between the first and second computers.

10. The method as in claim 1, wherein at least one of the first and second computers is not interconnected with a communication network via a connection other than through a respective network communication session with either the first or second phone.

11. The method as in claim 1, wherein only one of the first and second phones is a smartphone having both the respective computer and phone on a single device, wherein the respective network communication session is localized to the single device.

12. The method as in claim 1, wherein the established voice call is a voice over internet protocol (VoIP) call.

13. The method as in claim 1, further comprising:
    encoding data for the data exchange at the first computer in a format selected from the group consisting of: images, videos, executable programs, files, and raw data.

14. The method as in claim 1, wherein the data exchange between the first and second computers is a one-way data exchange from the first computer to the second computer.

15. The method as in claim 1, further comprising:
    prompting a user for authorization of at least one of either the first or second network communication sessions.

16. The method as in claim 15, wherein prompting is performed on at least one of either a phone or computer corresponding to the user.

17. The method as in claim 1, wherein the computers are personal computers (PCs).

18. A system, comprising:
    a wide area network (WAN);
    a first and second phone configured to have an established voice call between the first and second phones over the WAN;
    a first computer configured to:
    i) receive a trigger to establish a data communication session with a second computer, wherein at least one of the first and second computers lack access to a network for direct communication between the first and second computers over the network, ii) discover the first phone as a first authorized network device from the first computer in response to the received trigger, iii) establish a first network communication session between the first computer and the first phone to provide the first computer access to the established voice call on the WAN, and iv) transmit a request to the second phone over the established voice call to establish the data communication session between the first and second computers;

a second computer configured to:

i) receive the request, ii) discover the second computer as a second authorized network device from the second phone in response to the request, and iii) establish a second network communication session between the second phone and the second computer to provide the second computer access to the established voice call on the WAN;

and wherein the first and second computers are further configured to exchange data over the WAN between the first and second computers using the first and second network communication sessions and the established voice call; and wherein the first and second phones are mobile or cellular phones.

19. A method, comprising:

establishing a voice call between a wireless phone and a wired phone over a wide area network (WAN);

receiving a trigger at a first computer to establish a data communication session with a second computer, wherein at least one of the first and second computers lack access to a network for direct communication between the first and second computers over the network;

discovering the wireless phone as a first authorized network device from the first computer in response to the received trigger;

establishing a first network communication session between the first computer and the wireless phone to provide the first computer access to the established voice call on the WAN;

transmitting a request to the second phone over the established voice call to establish the data communication session between the first and second computers;

intercepting the request at a conversion device;

determining, by the conversion device, the second computer associated with the wired phone;

establishing a wired communication session between the conversion device and the second computer; and exchanging data over WAN between the first and second computers using the wireless network communication session and the established voice call, wherein the conversion device directs the voice call to the wired phone and the exchanged data to the second computer; and wherein the wireless phone is a mobile or cellular phone.

20. The method as in claim 19, wherein at least one of the first and second computers is not interconnected with a communication network via a connection other than through a respective network communication session with either the first or second phone.

21. The method as in claim 19, wherein only one of the first and second phones is a smartphone having both the respective computer and phone on a single device, wherein the respective network communication session is localized to the single device.

22. The method as in claim 19, further comprising:

encoding data for the data exchange at the first computer in a format selected from the group consisting of: images, videos, executable programs, files, and raw data.

* * * * *